United States Patent [19]

Sekizawa et al.

[11] Patent Number: 4,698,669

[45] Date of Patent: Oct. 6, 1987

[54] COLOR PICTURE READER AND METHOD FOR OPERATING THE SAME

[75] Inventors: Hidekazu Sekizawa, Yokohama; Haruko Kawakami, Funabashi; Naofumi Yamamoto, Tokyo, all of Japan

[73] Assignee: Kabushiki Kaisha Toshiba, Kawasaki, Japan

[21] Appl. No.: 810,556

[22] Filed: Dec. 19, 1985

[30] Foreign Application Priority Data

Mar. 31, 1985 [JP] Japan .................................. 60-67856

[51] Int. Cl.$^4$ .......................... H04N 1/00; H04N 1/46
[52] U.S. Cl. .......................................... 358/76; 358/80
[58] Field of Search .............................. 358/75, 76, 80; 340/701; 356/402, 405, 406; 355/37

[56] References Cited

U.S. PATENT DOCUMENTS

| | | | |
|---|---|---|---|
| 4,124,292 | 11/1978 | Van Wandelen | 355/37 |
| 4,379,292 | 4/1983 | Minato | 340/701 |
| 4,408,231 | 10/1983 | Bushaw et al. | 358/280 |
| 4,458,264 | 7/1984 | Tamura | 358/74 |
| 4,504,141 | 3/1985 | Yamakoshi | 358/80 |
| 4,544,952 | 10/1985 | Van Cang | 358/80 |
| 4,583,186 | 4/1986 | Davis | 358/76 |

FOREIGN PATENT DOCUMENTS

0140244 10/1983 European Pat. Off.
3420359 12/1984 Fed. Rep. of Germany.
57-133452 8/1982 Japan.

*Primary Examiner*—Howard W. Britton
*Attorney, Agent, or Firm*—Schwartz, Jeffery, Schwaab, Mack, Blumenthal & Evans

[57] ABSTRACT

There is presented a color picture reader, and a method for using the same, which enable one to obtain exact and stable color separated signals. By projecting standard light of a light source on a reference plate, there are set reference values of the color separated signals that correspond to the color of the reference plate. In actual measurement, the light source is controlled by comparing the color separated signals of the light from the light source that is reflected from the reference plate with the predetermined reference values so as to bring them to a coincidence.

23 Claims, 5 Drawing Figures

| j | NORMALIZED SIGNAL FOR WHITE REFERENCE PLATE | | | OPTIMUM MATRIX |
|---|---|---|---|---|
| 1 | Wn11 | Wn21 | Wn31 | A1 |
| 2 | Wn12 | Wn22 | Wn32 | A2 |
| 3 | Wn13 | Wn23 | Wn33 | A3 |
| ⋮ | ⋮ | ⋮ | ⋮ | ⋮ |
| K | Wn1k | Wn2k | Wn3k | A4 |

FIG. 5

COLOR PICTURE READER AND METHOD FOR OPERATING THE SAME

BACKGROUND OF THE INVENTION

1. Field of the Invention

The present invention relates to a color picture reader that is applied to a color copying device or the like, and in particular, to the correction to the variations in the spectral distribution of the light source.

2. Description of the Prior Art

In the prior art color picture reader, use is made of a light source with high color rendering properties, such as halogen lamp, in order to obtain satisfactory color separation characteristics. In the case of such a light source, the spectral distribution can be maintained constant by keeping the applied voltage at a constant value so that handling of the device is relatively easy. However, such a light source has low efficiency and generates large amount of heat, and hence has been difficult to be applied to a small size device. For that reason, a fluorescent lamp has been examined to replace such a light source.

In the case of using a fluorescent lamp as a light source, its emission efficiency is satisfactory, and moreover, the spectral distribution of the light source can be varied fairly freely by appropriately combining a plurality of kinds of phosphors. Consequently, by combining a fluorescent lamp that possesses such properties with a reader, it becomes comparatively easy to achieve satisfactory color separability. However, the temperature of the tube wall of a fluorescent lamp becomes low when the temperature of the environment is low, and hence, the quantity of emitted light is less and the emissive spectral distribution, too, is different, compared with the rated values (values at the tube wall temperature around 45° C.). In addition, the emission spectrum varies depending upon the length of its use, and moreover, the properties at the time of their manufacture vary widely. Therefore, when a color orginal is read by using such a light source, even with a correction for the brightness, the color separated signals that are obtained will be different from those at the rated conditions. This gives rise to a shortcoming that the truly color separated signals cannot be obtained and that the color signals obtained are different from the actual color orginals.

In attempts to remove these drawbacks, there has been considered such a method as to wait for a fixed length of time, by keeping the light source turned on, after closing the power source or to employ a device in which a heating element is arranged around the fluorescent lamp to control the temperature of the tube wall. However, in the case of waiting for a fixed length of time after turning on the lamp, the time required for stabilizing the light source varies with the temperature of the environment so that it not satisfactory for stabilization of the light source. Moreover, in the case of controlling the temperature, the control that is given may not necessarily be applied to the section from which the light is actually being emitted. Thus, there exists a drawback that it is not easy to keep the emissive spectral distribution constant. Furthermore, variations in the emissive spectral distribution is a phenomenon which is not peculiar to fluorescent lamps but is common also to many other light sources.

SUMMARY OF THE INVENTION

It is an object of the present invention to provide a color picture reader, and a method for operating the same, that are adapted for obtaining accurate and stabilized color separated signals.

It is another object of the present invention to provide a device, and a method thereon, that are capable of obtaining accurate color picture reading by carrying out an appropriate color correction, even when the conditions of the light source change due to changes in the environmental temperature.

It is still another object of the present invention to provide a color picture reader, and a method thereon, that are adapted for obtaining accurate and stabilized color separated signals, even when the light source is replaced by another.

According to an aspect of the invention, the standard light of the light source is projected on a reference plate, reference values for the color separated signals corresponding to the color or the reference plate are set, the reference values are compared with the color separated signals for the light of the light source that is reflected from the reference position, and the light source is controlled so as to bring the two into coincidence.

According to another aspect of the invention, the standard light of the light source is projected on a reference plate, reference values for the color separated signals corresponding to the color of the reference plate are set, and the reference values are compared with the color separated signals for the light of the light source that is reflected from the reference plate. Further a matrix circuit is provided that transforms the color separated signals from those after the variation in the light source to those before the variation, is adjusted, and color correction is accomplished by the adjustment just described.

BRIEF DESCRIPTION OF DRAWINGS

These and other objects, features and advantages of the present invention will be more apparent from the following description of the preferred embodiments, taken in conjunction with the accompanying drawings, in which.

DETAILED DESCRIPTION OF THE INVENTION

Figure 1:
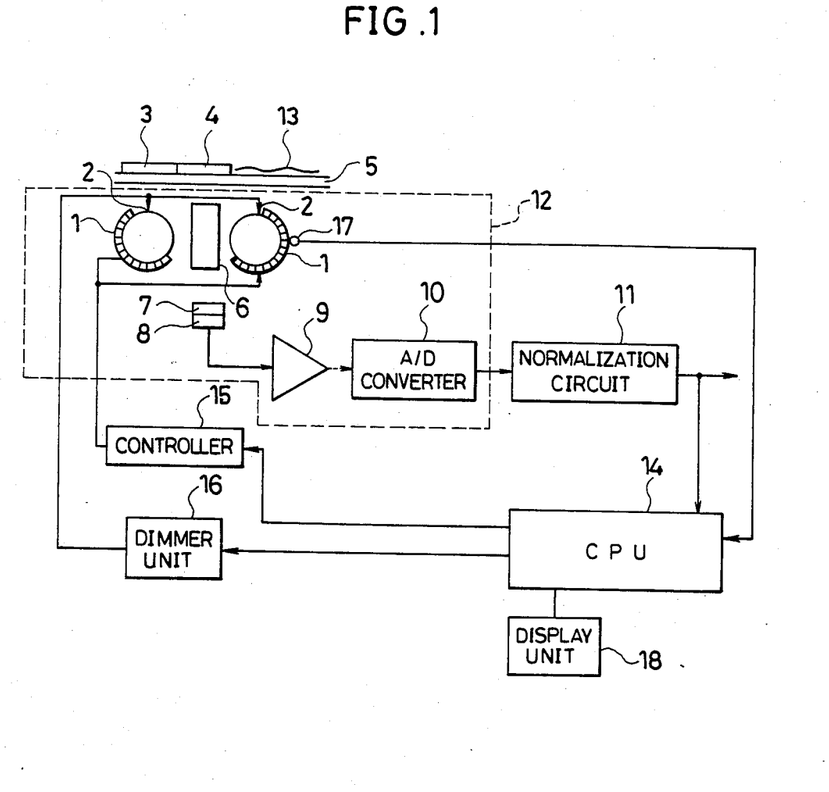
FIG. 1 is a diagram illustrating a first embodiment of the color picture reader in accordance with the present invention.

FIG. 1 is a diagram which illustrates a first embodiment of the color picture reader in accordance with the present invention. The reference numeral 1 is a heating element 2, is a light source, 3 is a black reference plate, 4 is a white reference plate 5, is a glass plate, 6 is a rod lens array, 7 is a color filter assembly, 8 is a solid sensor assembly, 9 is an amplifier, 10 is an A/D converter 11, is a normalization circuit, 12 is a movable portion, 13 is an original, 14 is a CPU 15, is a controller for the heating element, 16 is a dimmer unit for the light source 2, 17 is a temperature sensor, and 18 is a display unit.

Prior to reading of the original 13, the black reference plate 3 and the white reference plate 4 are irradiated through the glass plate 5 by the light source 2 that has the heating element 1. The reflected light from the reference plate is trichromatically focused on the solid sensor 8 with the color filter 7, for instance, CCD, by means of the rod lens array 6. The recieved light is converted photoelectrically, amplified by the amplifier 9, and converted to a digital signal by the A/D converter 10. The digitized signal is normalized in the normalization circuit 11. In the normalization circuit 11, the reflected light from the black reference plate 3 is first focused, and the signals $B_i$ (i=1, 2, and 3 corresponding to the three colors of the filter 7) from the solid sensor 8 are memorized there. In this case, the light source 2 may or may not be turned on. Then in the state with the light source 2 turned on, the movable section 12 enclosed by the broken line in the figure is move to read the signals $W_i$ (i=1, 2, and 3) for the reflected light from the white reference plate 4, and the signals ($W_i-B_i$) are memorized by the normalization circuit 11. The movable section 12 is further moved to read the original 13 and obtains the signals $S_i$ (i=1, 2, and 3) and generates $$X_i=(S_i-B_i)/(W_i-B_i) \tag{1}$$

as the output signals of the normalization circuit 11. The output signal $X_i$ of the normalization circuit 11 represents the value that is corrected for the distribution of light quantity of the light source, the scatter in the consistency of the color filter 7, and the scatter in the sensitivity of the solid sensor 8, that is, the value that is shading corrected. Accordingly, the normalization will give $X_i=1$ if it is a white original and $X_i=0$ if it is a black original.

However, when the light quantity distribution or the emission distribution of the light source 2 does not remain constant, satisfactory color separation cannot be accomplished due to the changes that occur in the shading-corrected color separated signals in response to the variations in the light source 2. Therefore, it becomes necessary either to control the light source 2 so as to keep the spectral distribution or to compensate for the effects due to variations in the spectral distribution of the light source 2. To begin, in a first embodiment that follows, description will be given of the method for controlling the spectral distribution or the like of the light source to remain constant.

Now, calling the spectral characteristics of the color filter $f_i(\lambda)$ (i=1, 2, and 3) and the spectral sensitivity of the solid sensor 8 $S(\lambda)$, the spectral characteristics of the equivalent filter F is defined by the following equation:

$$\vec{F} = \begin{pmatrix} F_1 \\ F_2 \\ F_3 \end{pmatrix} \tag{2}$$

where $$F_i(\lambda)=f_i(\lambda)S(\lambda). \tag{3}$$

Further, by calling the emission spectral distribution of the light source 2 $L_o(\lambda)$, the color separated signla $\vec{W}_o$ is represented by the following equation.

$$\vec{W}_0 = \begin{pmatrix} W_{01} \\ W_{02} \\ W_{03} \end{pmatrix} = \begin{pmatrix} \int F_1(\lambda)L_0(\lambda)d\lambda \\ \int F_2(\lambda)L_0(\lambda)d\lambda \\ \int F_3(\lambda)L_0(\lambda)d\lambda \end{pmatrix} \tag{4}$$

It should be noted that $\vec{W}_o$ in the above corresponds to the values in which the signal outputs $B_i$ that are obtained by reading the black reference plate 3 have already been subtracted. In the sensor outputs that will be treated in the following pages it should also be understood that they correspond to the values from which $B_i$ have been subtracted.

Next, suppose that the spectral distribution of the light source changed from $L_o(\lambda)$ to $L_1(\lambda)$, namely, $$L_1(\lambda)=aL_o(\lambda)+\delta L(\lambda) \tag{5}$$

In the above equation, a represents the change in the brightness and $L(\lambda)$ represents the change in the spectral distribution that satisfies the following condition:

$$\sum_{i=1}^{3} \int L(\lambda)F_i(\lambda)d\lambda = 0$$

It should be remembered that for an ordinary light source one may assume that $|aL_o(\lambda)| >> |L(\lambda)|$. In this case the color separated signals $\vec{W}_1$ read from the white reference plate 4 after the variation in the spectral distribution of the light source are represented by the following equation.

$$W_1 = \begin{pmatrix} W_{11} \\ W_{12} \\ W_{13} \end{pmatrix} = \begin{pmatrix} \int F_1(\lambda)L_1(\lambda)d\lambda \\ \int F_2(\lambda)L_1(\lambda)d\lambda \\ \int F_3(\lambda)L_1(\lambda)d\lambda \end{pmatrix} =$$

$$a\begin{pmatrix} \int F_1(\lambda)L_0(\lambda)d\lambda \\ \int F_2(\lambda)L_0(\lambda)d\lambda \\ \int F_3(\lambda)L_0(\lambda)d\lambda \end{pmatrix} + \begin{pmatrix} \int F_1(\lambda)\delta L(\lambda)d\lambda \\ \int F_2(\lambda)\delta L(\lambda)d\lambda \\ \int F_3(\lambda)\delta L(\lambda)d\lambda \end{pmatrix} =$$

$$a\vec{W}_0 + \begin{pmatrix} \int F_1(\lambda)\delta L(\lambda)d\lambda \\ \int F_2(\lambda)\delta L(\lambda)d\lambda \\ \int F_3(\lambda)\delta L(\lambda)d\lambda \end{pmatrix}$$

If the mean value of the components of the color separated signals $\vec{W}_o$ is called $\overline{W}_o$, and the corresponding value after the variation $\vec{W}_1$ is called $\overline{W}_1$, they may be given respectively by the following expressions.

$$\overline{W}_0 = (\tfrac{1}{3}) \sum_{i=1}^{3} \int F_i(\lambda)L_0(\lambda)d\lambda, \tag{6}$$

$$\overline{W}_1 = (\tfrac{1}{3}) \sum_{i=1}^{3} \int F_i(\lambda)L_1(\lambda)d\lambda$$

$$= (\tfrac{1}{3}) \sum_{i=1}^{3} \int F_i(\lambda)aL_0(\lambda)d\lambda \tag{7}$$

-continued $$= a\vec{W}_0$$

Next, the color separated signal $\vec{W}_o$ read from the white reference plate (prior to the variation in the spectral distribution of the light source) and $\vec{W}_1$ (after the variation in the spectral distribution of the light source) are normalized in terms of $\vec{W}_o$ and $\vec{W}_1$, respectively, the results $\vec{W}_{no}$ and $\vec{W}_{n1}$ are given by $$\vec{W}_{no} = \vec{W}_o/\vec{W}_o, \quad \vec{W}_{n1} = \vec{W}_1/\vec{W}_1. \tag{8}$$

By taking the difference between them one obtains $$\vec{W}_{n1} - \vec{W}_{no} = (1/W_1)\int F(\lambda)\delta L(\lambda)d\lambda \tag{9}$$

from which one can estimate the "vector representation" $\vec{\delta L}$ of $\delta L$ as $$\vec{\delta L} = (\delta L(\lambda_o); \delta L(\lambda_o + \Delta\lambda), \ldots, \delta L(\lambda_o + (m+1)\Delta\lambda))^t$$

In the above equation, $\lambda_o$ and $\lambda_o + (m-1)\Delta\lambda$ represent the lower and upper limits, respectively, of the wavelength region of interest, and $\Delta\lambda$ is the discretization unit of the wavelength which may be chosen appropriately so that the integer m can be fixed accordingly. Moreover, L is defined by $$\delta L = F^+(\vec{W}_{n1} - \vec{W}_{no})(W_1/\Delta\lambda) \tag{10}$$

and $F^+$ is given by $F^+ = MF^t(FMF^t)^{-1}$ with $$F = \begin{pmatrix} F_1(\lambda_0), F_1(\lambda_0 + \Delta\lambda), \ldots, F_1(\lambda_0 + (m-1)\Delta\lambda) \\ F_2(\lambda_0), F_2(\lambda_0 + \Delta\lambda), \ldots, F_2(\lambda_0 + (m-1)\Delta\lambda) \\ F_3(\lambda_0), F_3(\lambda_0 + \Delta\lambda), \ldots, F_3(\lambda_0 + \cdot(m-1)\Delta\lambda) \end{pmatrix}$$

where the superscript t indicates the transposition of a matrix or a vector, and the Markov's covariance matrix is defined by $$M = \begin{pmatrix} 1 & \rho & \rho^2 & \ldots & \rho^{m-1} \\ \rho & 1 & & & \cdot \\ \rho^2 & & 1 & & \cdot \\ \cdot & & & \cdot & \\ \cdot & & & & \cdot \\ \rho^{m-1} & \ldots & & \ldots & 1 \end{pmatrix}$$

In the above expressions $\Delta\lambda$ may be taken about 10 nm in practice, and the value of about 0.90 will be appropriate for the corelation coefficient $\rho$ when $\Delta\lambda = 10$ nm.

Now, if it is possible to estimate the variation in the spectral distribution of the light source by means of the signals obtained from the white refernce plate according to Eq.(10), then it becomes also possible to estimate the reflected signal for the ink color j when the spectral distribution of the light source has been changed. By calling the spectral reflection factor of the ink color j $I_j(\lambda)$, the estimated value $\vec{X}_{1j}$ of the normalized signal (output signal of the normalization circuit 11) can be shown to be given by $$\vec{X}_{1j} = \begin{pmatrix} \int I_j(\lambda)F_1(\lambda)L_1(\lambda)d\lambda/W_{11} \\ \int I_j(\lambda)F_2(\lambda)L_1(\lambda)d\lambda/W_{12} \\ \int I_j(\lambda)F_3(\lambda)L_1(\lambda)d\lambda/W_{13} \end{pmatrix} =$$

$$\begin{pmatrix} \int I_j(\lambda)F_1(\lambda)aL_0(\lambda)d\lambda/W_{11} \\ \int I_j(\lambda)F_2(\lambda)aL_0(\lambda)d\lambda/W_{12} \\ \int I_j(\lambda)F_3(\lambda)aL_0(\lambda)d\lambda/W_{13} \end{pmatrix} + \begin{pmatrix} \int I_j(\lambda)F_1(\lambda)\delta L(\lambda)d\lambda/W_{11} \\ \int I_j(\lambda)F_2(\lambda)\delta L(\lambda)d\lambda/W_{12} \\ \int I_j(\lambda)F_3(\lambda)\delta L(\lambda)d\lambda/W_{13} \end{pmatrix}$$

and taking into consideratiion the assumption $|a-L_o(\lambda)| \gg |\delta L(\lambda)|$, which renders an approximation $$\begin{pmatrix} W_{11} \\ W_{12} \\ W_{13} \end{pmatrix} = a \begin{pmatrix} W_{01} \\ W_{02} \\ W_{03} \end{pmatrix},$$

it can be approximated as follows.

$$\vec{X}_{1j} = \begin{pmatrix} \int I_j(\lambda)F_1(\lambda)L_0(\lambda)d\lambda/W_{01} \\ \int I_j(\lambda)F_2(\lambda)L_0(\lambda)d\lambda/W_{02} \\ \int I_j(\lambda)F_3(\lambda)L_0(\lambda)d\lambda/W_{03} \end{pmatrix} + \tag{11}$$

$$\begin{pmatrix} \int I_j(\lambda)F_1(\lambda)\delta L(\lambda)d\lambda/W_{11} \\ \int I_j(\lambda)F_2(\lambda)\delta L(\lambda)d\lambda/W_{12} \\ \int I_j(\lambda)F_3(\lambda)\delta L(\lambda)d\lambda/W_{13} \end{pmatrix} =$$

$$\vec{X}_{0j} + \begin{pmatrix} \int I_j(\lambda)F_1(\lambda)\delta L(\lambda)d\lambda/W_{11} \\ \int I_j(\lambda)F_2(\lambda)\delta L(\lambda)d\lambda/W_{12} \\ \int I_j(\lambda)F_3(\lambda)\delta L(\lambda)d\lambda/W_{13} \end{pmatrix}$$

In Eq. (11), $\vec{X}_{0j}$ is the normalized signal for the normalized ink color j prior to the variation in the spectral distribution of the light source. The second term on the right-hand side of the equation represents the effect of the variation in the spectral distribution of the light source.

Here, if the normalized signal $\vec{W}_{n1}$ of the signal for the white reference plate, after the variation in the spectral distribution of the light source has occurred (spectral distribution at the time of taking measurement), is made to be equal to the corresponding signal $\vec{W}_{no}$ at the time of regulating the device, then there will be obtained $\vec{X}_{1j} = \vec{X}_{0j}$ since the second term of Eq.(11) vanishes then with SL given by Eq.(10). In other words, it is demonstrated that if the spectral distribution of the light source is adjusted so as to have the normalized signal, corresponding to the color separated signals obtained by reading the white reference plate, maintained at a constant value for all times, then there will be obtained constant color separated signals.

Thus, at the time of closing the power source for the color picture reader, the light source 2 is arranged by CPU 14 to be turned on by sending a control signal that causes to have a maximum light quantity to the dimmer unit 16 of the light source 2, and by sending a signal that causes the flow of a maximum current in the controller 15 of the heating element 1. Next, the color separated signal $\vec{W}_1$, that had been obtained in the normalization circuit 11 by reading the black reference plate 3 and the white reference plate 4, is input to the CPU 14. The color separated signal $\vec{W}_1$ is normalized according to Eq.(8) to obtain $\vec{W}_{n1}$. $\vec{W}_{n1}$ is compared with the color separated signal $\vec{W}_{no}$ that was set beforehand (the value obtained at the time of adjusting), and, while making continuous measurement on $\vec{W}_{n1}$, signals are sent from the CPU 14 to the controller 15 and the dimmer unit 16 to yield their respective maximum outputs, until $\vec{W}_{n1}$ becomes equal to $\vec{W}_{no}$.

At the point in time when $\vec{W}_{n1}$ becomes equal to $\vec{W}_{no}$, lighting of the light source 2 is terminated, the temperature information from the temperature sensor 17 which is attached to the heating element 1 is input to the CPU 14, and a control signal is sent to the controller 15 to maintain the temperature at that time.

In this manner, it becomes possible to obtain a spectral distribution of the light source 2 which is constant for all times, and to obtain stabilized color separated signals.

In the above embodiment, when the light source is switched to one with different spectral distribution, there may happen that the spectral distribution set beforehand may never be realized however long one waits for that. For some light source such as fluorescent lamp, it may be possible to minimize the dispersion in the spectral distribution by means of a thorough quality control of the products. However, in the case of using such a light source for the purpose of obtaining a constant spectral distribution, the parts to be used have to be limited to some extent. In a second embodiment, therefore, there will be described a color picture reader that will have no variation in the color separation characteristics under the influence of the enivronmental temperature and others, even when use is made of a light source which had different spectral distribution.

Figure 2:
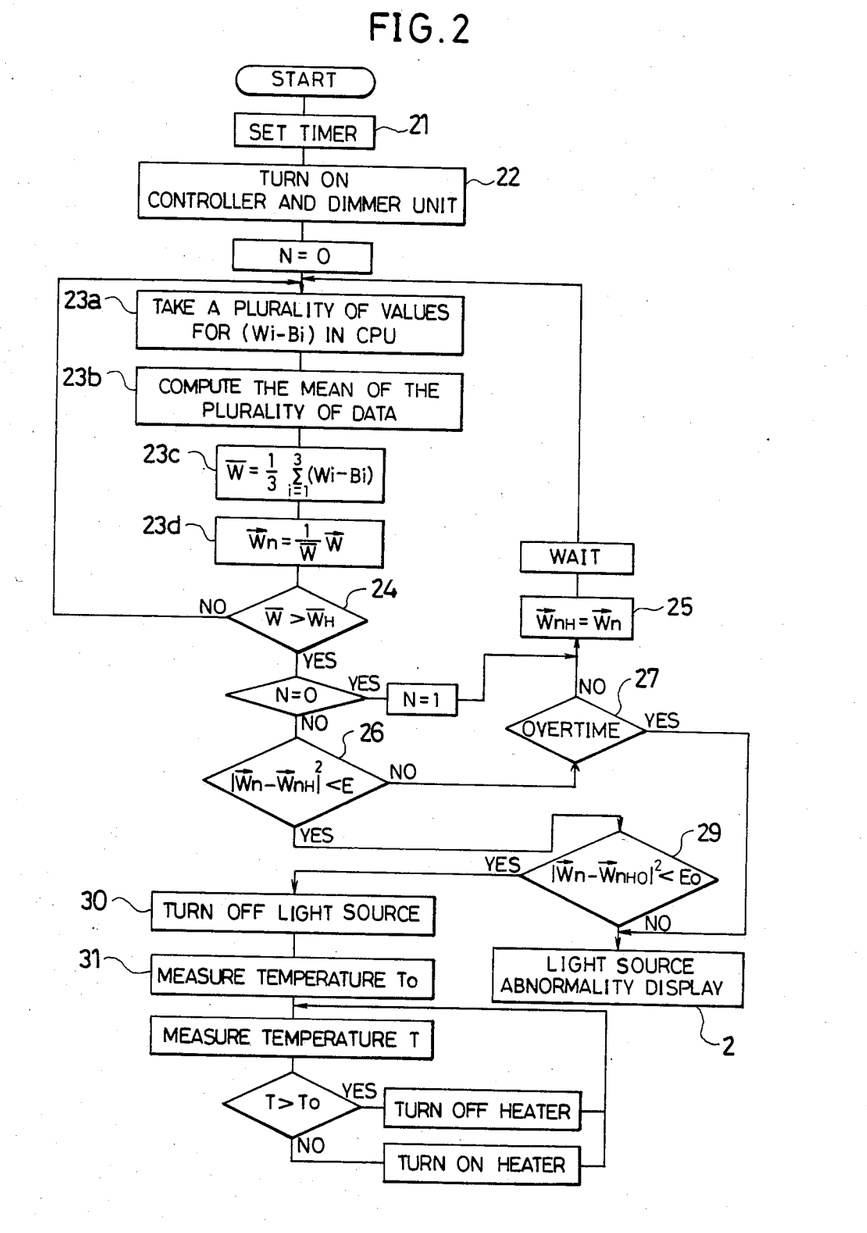
FIG. 2 is a flow chart showing the control of the light source for a second embodiment of the present invention.

In FIG. 2 is shown a flow chart for controlling the light source in the second enbodiment of the present invention.

When the power source for the color picture reader is turned on, first the timer in the CPU 14 is set (step 21), and then signals are sent from the CPU 14 to the controller 15 and the dimmer unit 16 to yield maximum light quantity of the light source 2 and to turn on the heating element 1 (22). Next, the black reference plate 3 and the white reference plate 4 are read, a plurality (for example, 16) of signals ($W_i - B_i$) for each of i= 1, 2, and 3 are input to the CPU 14 from the normalization circuit 11 (23a), and their mean is computed (23b). By the use of a plurality of the data it becomes possible to reduce the influence of the noise. Further, the mean output $\overline{W}$ of the color separated signals is computed in a manner similar to Eq.(7) (23c), and the normalized color separated signal $\vec{W}_n$ is evaluated similar to Eq.(8) (23d).

Next, whether the mean output $\overline{W}$ of the color separated signals exceeds a fixed light quantity $\overline{W}_H$ is judged (24). If the answer is NO, the black reference plate 3 and the white reference plate 4 are read again and the steps 23a and 23d are repeated, and if the answer is YES, that is, the relation $\overline{W} > \overline{W}_H$ holds, $\vec{W}_n$ is set as $\vec{W}_{nH}$ (25). Then, after elapse of a given length of time, $\vec{W}_n$ is evaluated again (23a-23d) which is compared with $\vec{W}_{nH}$ (26) to judge whether or not their difference is less than a given value. Namely, the color separated signal is measured at a given time interval (23a-26), and the light source 2 is kept turned on as long as the output signal does not converge (that is, its variations fail to be less than a given value). Further, this loop includes an operation (27) which checks whether or not the time spent so far exceeds the duration that was set initially (27), so that when the time exceeds that duration, the light source abnormality display (28) is turned on by regarding that there is some abnormality in the light source.

When the variations in the color separated signal become less than a given value, $\vec{W}_n$ is compared with a predetermined value $\vec{W}_{nHo}$ (29). If the difference between them falls below a given value, the light source 2 is turned off (30), and the temperature $T_o$ on the temperature sensor 17 which is attached to the heating element 1 of the light source 2 is measured (31). If on the other hand $\vec{W}_n$ deviates considerably from $\vec{W}_{nHo}$ (that is, if their difference exceeds a given value), the light source abnormality display (28) is turned on by regarding that there exists some abnormality in the light source 2.

After the temperature $T_o$ of the temperature sensor 17 is measured, a signal is sent from the CPU 14 to the controller 15 to control the heating element 1 to keep it at the constant temperature $T_o$. It is to be mentioned that although the flow chart is shown in the form of a closed loop, when the start button for scanning original is pressed, the processing is arranged to be carried out by interruption. That is, when the start button for scanning original is pressed, the original is read by turning on the light source 2.

As in the foregoing, it becomes possible to scan the original 13 always with the spectral distribution of the stabilized light source 2 even when there in a variation in the environmental temperature, and to obtain stable color separated signals. In addition, when the light source 2 is replaced by another light source with spectral distribution which is different from that of the original light source at the time of its adjustment, there will be obtained stable color separated signals that are not affected by the temperature of the surroundings.

Moreover, it becomes possible to know the time for replacing the light source since abnormality in the light source is arranged to be displayed on the display unit 18.

Furthermore, in the foregoing embodiments description has been given in conjunction with the case of light source which is a fluorescent lamp. However, the light source need not be limited to the fluorescent lamp only. Thus, for example, when a halogen lamp is used as the light source, the spectral distribution will differ for different voltage of lighting. Even for such a case it becomes possible to stabilize the spectral distribution of the light source.

Figure 3:
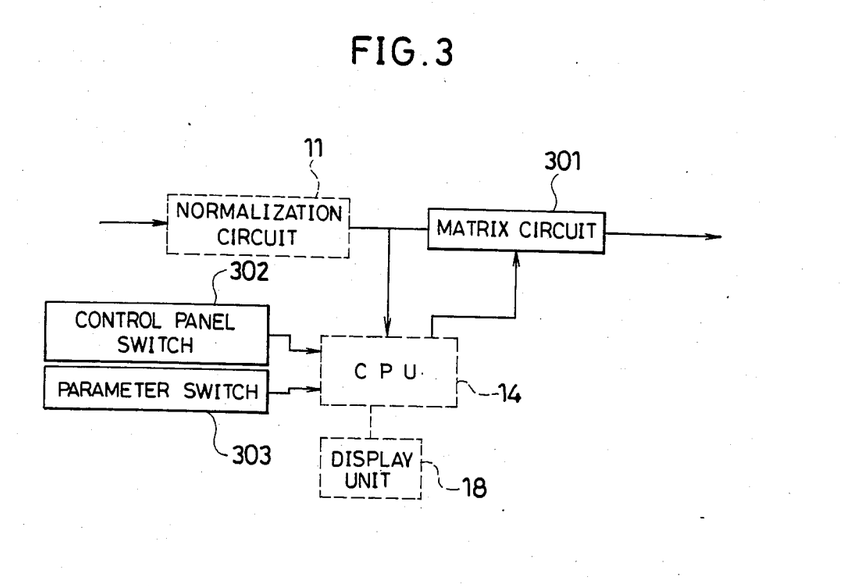
FIG. 3 is a partial diagram of the color picture reader for illustrating a third embodiment of the present invention.

In FIG. 3, there is shown a third embodiment of the color picture reader according to the present invention. In the figure, the normalization circuit 11 and CPU 14 correspond to those shown in FIG. 1, and description on other components that appear also in FIG. 1 will be omitted. In FIG. 3, reference numeral 301 is a matrix circuit, 302 is a control panel switch, and 303 is a parameter switch.

A special feature of the third embodiment is the provision of the matrix circuit 301. The signals that are normalized in the normalization circuit 11 are input to the matrix circuit 301, and for producing outputs $Z_i$ (i=1, 2, and 3) after processing based on the following.

$$\begin{pmatrix} Z_1 \\ Z_2 \\ Z_3 \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} X_1 \\ X_2 \\ X_3 \end{pmatrix} \quad (12)$$

The function of the matrix circuit 301 is to obtain the predetermined color separated signals in accordance with the external interface, to carry out the color correction.

In connection with the first embodiment, it has been shown that the normalized signal $X_{1j}$ for a normalized ink color j after a variation in the spectral distribution of the light source, can be estimated by Eq.(11). The optimum matrix A for the above purpose may be determined by minimizing the deviation ΔE from the visual system that is given below $$\Delta E = \sum_{j=1}^{k} |\vec{T_j} - M\vec{X_{1j}}|^2, \quad (13)$$

where $\vec{T_j}$ is the tristimulus values of the vision for the ink color j. Namely, it will be given by $$A = \left( \sum_{j=1}^{k} \vec{T_j} \vec{X'_{1j}} \right) \left( \sum_{j=1}^{k} \vec{X_{1j}} \vec{X'_{1j}} \right)^{-1}. \quad (14)$$

By setting the matrix A found in this way in the matrix circuit 301 to read the original, there can be obtained an output of the matrix circuit 301 which is stable and affected only little by the variation in the light source even when there occurred a variation in the spectral distribution of the light source. The matrix A is read from the display unit 18 as the result of computation in the CPU 14, and is input manually to the parameter switch 303. Further, it is possible to construct the CPU so as to input the optimum matrix A directly to the matrix circuit 301 based on the inputs from the normalization circuit 11.

In the present embodiment, analogous to the previous embodiment, even when the light source such as a fluorescnet lamp is switched to a light source that possesses different spectral distribution, correction is given by estimating the variation in the spectral distribution of the light source, so that there can be obtained stable color separated signals.

In addition, by combining the present embodiment with the arrangement for controlling the light source that was shown in connection with the first and the second embodiment, it becomes possible to obtain more stable color separated signals.

Next, a fourth embodiment of the invention will be described. According to the third embodiment, it was possible to give a color correction by estimating the variation in the spectral distribution of the light source from the signals obtained by color separating the reflected light from the white reference plate. However, the algorithm for determining the matrix is complicated. Now, it is noted that in an ordinary color picture reader, the light source to be used is limited by the kind of reader, and the range of the variation in the spectral distribution is also limited. Accordingly, the color correction will be easier to obtain if one prepares a table of optimum matrices with respect to the variation in the light source for the range of variations that are possible to take place, corresponding to the color separated signals for the reflected light from the white reference plate, and determines the matrix required for the color correction based on the table.

Figure 4:
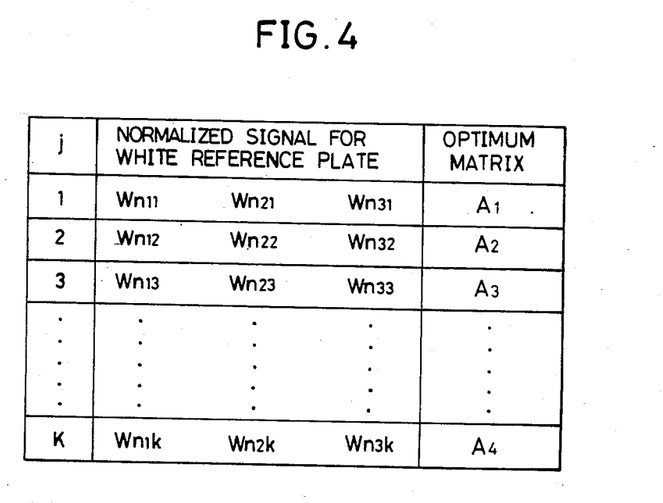
FIG. 4 is a diagram showing the correspondence between the color separated signals and the matrices that are used in a fourth embodiment.
Figure 5:
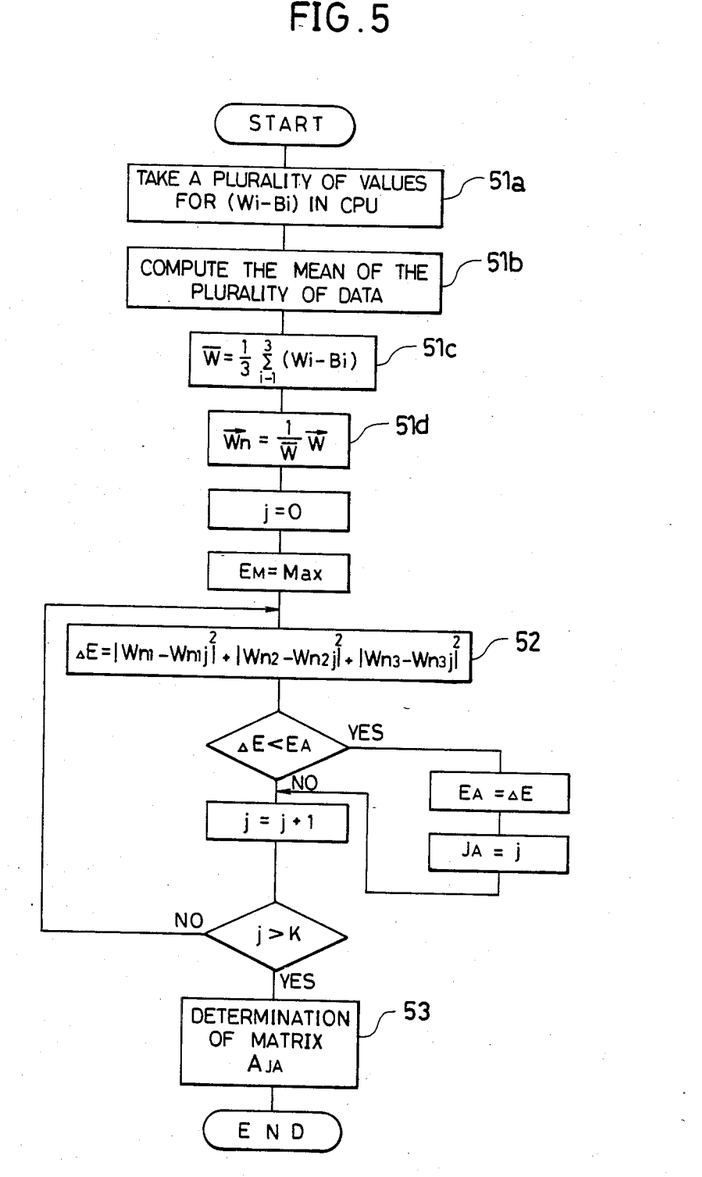
FIG. 5 is a flow chart illustrating the method of determining the matrix used in a fourth embodiment.

In FIG. 4, there are shown these matrices arranged in the form of a table corresponding to the color separated signals, and FIG. 5 shows a flow chart concerning the method for determining the matrix A.

First, analogous to the second embodiment a plurality (for example, 16) of signals ($W_i - B_i$) for each of i=1, 2, and 3 are input from the normalization circuit 11 to the CPU 14 (51a), and their means are computed (51b). Next, the mean output $\overline{W}$ of the color separated signals is computed similar to Eq.(7) (51c), and the normalized color separated signal $\overline{W}_n$ is evaluated similar to Eq.(8) (51d).

The data in the table, shown in FIG. 4, of optimum matrices $A_j$ that correspond to the normalized color separated signals $W_{nij}$ (i=1 to 3 and j=1 to k) are memoraized in the CPU 14. Although $W_{nij}$ and $A_j$ may be found from the computer simulation based on the computational expressions given in connection with the third embodiment, the matrix M may also be determined according to Eq(14) by finding $X_{ij}$ that corresponds to Eq.(11) by experiment.

Namely, by computing $$\Delta E = |W_{n1} - W_{n1j}|^2 + |W_{n2} - W_{n2j}|^2 + |W_{n3} - W_{n3j}|^2 \quad (15)$$

based on the color separated signal $\overline{W}_n$ (52), *the matrix that gives the shortest distance to $\overline{W}_{nj}$* listed in the table of FIG. 4 is selected. In this way the optimum matrix $A_{JA}$ is determined (53), where JA is the value of j selected in the above.

In this embodiment, there are not required complicated computations as in the third embodiment, and the determination of the matrix can be accomplished by the mere computation of the mutual distance among the normalized color separated signals for the white reference plate. Therefore, it is possible to give a satisfactory processing by means of a CPU with 8 bits or so. Furthermore, expressions other than that of Eq.(15) may be employed as the distance ΔE. Thus, for example, ΔE given by $$\Delta E = |W_{n1} - W_{n1j}| + |W_{n2} - W_{n2j}| + |W_{n3} - W_{n3j}|$$

instead of Eq.(15) may be used as the criterion. In this case, a faster computational processing will become possible.

Now, a fifth embodiment of the present invention will be described. In FIG. 3, the CPU 14 is informed first by the control panel switch 302 or the parameter switche 303 that it is in the light soruce (fluorescent lamp) checking mode. Then, the CPU carries out similar operation as in the fourth embodiment to determine the elements of the optimum matrix. The number j of the optimum matrix is displayed on the display unit 18. The operator then sets the numerical value that appeared on the display unit 18 to the parameter switch 303. In this case, at the usual time of reading the original, the matrix parameters are determined directly by the numerical values on the parameter switch 303, without carrying out the change of parameters of the color correction matrix obtained from the white reference plate. In this manner, it becomes possible to accomplish a fast reading.

In addition, by setting the system to the light source checking mode, it becomes possible to have a check on the abnormality or the time for replacing of the light source 2. Namely, when the numerical values of the parameters for correction deviate markedly from the standard values, the state is made to correspond, for example, to the case of j=1 or j=k of FIG. 4. If it is considered that a correction is difficult to be made, then it will be displayed on the display unit 18 that it is either due to abnormality in the light source 2 or it is time to replace the light source. In this way, detection of abnormality of the light source will be possible.

Moreover, in each of the preceding embodiments, description has been made in conjunction with a method in which use is made of a black referfence plate and a white reference plate. However, needless to say, it may be replaced by the detection by means of a direct color separation of the light source.

Furthermore, the variation in the spectral distribution of the light source may be detected by the use of reference plates of specified colors instead of the black and white reference plates. In such a case, it may become possible to detect the variations in the spectral distribution of the light source with higher sensitivity. For instance, in the case of a light source with large variations in the emission spectral distribution in the red region of the spectrum, the variations in the spectral distribution of the light source may be detected by means of a reference plate of red series. By such an arrangement, it becomes possible to detect the variations in the spectral distribution of the light source, and to carry out the more desirable optimum color correction.

Various modifications will become possible for those skilled in the art after receiving the teachings of the present disclosure without departing from the scope thereof.

What is claimed is:

1. A device for reading a color picture by means of a plurality of color separated signals, comprising:
   a light source for radiating light on an object to be read,
   light receiving means for receiving light which is reflected from the object to be read, and for outputting a plurality of color separated signals based on the light received, and
   means for controlling a spectral component of the light from the light source, by comparing a spectral component of the color separated signals obtained based on the light reflected from a reference plate, with predetermined reference values so as to make the difference between the two to be zero.

2. A color picture reader of claim 1, wherein the reference values are determined from the color separated signals that are output by the light receiving means, based on the light from the light source reflected from the reference plate under standard conditions.

3. A color picture reader of claim 2, wherein said controlling means includes means for normalizing said color separated signals to produce normalized color separated signals and controls the light source based on the comparison between normalized reference values and the normalized color separated signals.

4. A color picture reader of claim 3, further comprising a heating element and a dimmer unit, said controlling means controlling said heating element and said heating element heating said light source.

5. A method for stabilizing the output of a light source for a device to be used for reading a color picture by means of a plurality of color separated signals, comprising the steps of:
   setting reference values for color separated signals corresponding to a spectral component of the color of a reference plate,
   projecting light from a light source on the reference plate,
   obtaining a plurality of color separated signals based on the reflected light from the reference plate, and
   controlling a spectral component of the light source to minimize the difference between the reference values and the color separated signals by comparing same.

6. A method for stabilizing the light source output of claim 5, wherein the reference plate is a white reference plate.

7. A method for stabilizing the light source output of claim 6, wherein the reference value setting step further comprises the step of:
   obtaining a set of color separated signals corresponding to the light reflected from a black reference plate,
   obtaining a set of color separated signals corresponding to the light reflected from the white reference plate,
   evaluating the difference between the two sets of color separated signals, and repeating the above two steps until the difference is stabilized, and
   setting the difference between the two sets of color separated signals when the difference is stabilized.

8. A method for stabilizing the light source output of claim 7, further comprising a step of obtaining a normalized reference value and normalized color separated signals by dividing each component by a linear combination of the components.

9. A method for stabilizing the light source output of claim 8, wherein the controlling step is a step in which a fluorescent lamp is used as a light source, a heating element is arranged round the fluorescent light, and the current in the heating element is controlled based on the difference between the reference values and the color separated signals.

10. A method for stabilizing the light source output of claim 9, further comprising a step of measuring the temperature of the light source when, in the step for setting the reference value, the difference between the color separated signals for the white and black reference plates is stabilized and the reference value is determined, and a step of maintaining the device at the measured temperature.

11. A method for stabilizing the light source output of claim 9, further comprising a step for displaying an indication of an abnormality of the light source when the differnce between the color separated signals for the white and black reference plates does not come down to a level below a specified value after elapse of a fixed length of time.

12. A method for stabilizing the light source output of claim 11, further comprising a step of displaying an indication of an abnormality of the light source when a standard value of said color separated signals deviates more than a given value from the reference value.

13. A device for reading a color picture by means of a plurality of color separated signals, comprising:
   a light source for radiating light on an object to be read,
   a reference plate,
   light receiving means for receiving light from the object to be read, and for obtaining a plurality of color separated signals based on the light received, and
   a matrix circuit which compares reference values determined in advance and a spectral component of the color separated signals obtained from the light of the light source reflected from the reference plate, and corrects for the variations in the light from the light source based on the spectral component of the color separated signals.

14. A color picture reader of claim 13, wherein the matrix A to be set in the matrix circuit is given by $$A = \sum_{j=1}^{k} (T_j X'_{1j}) \sum_{j=1}^{k} (X_{1j} X'_{1j})^{-1}$$

where $T_j$ is the color separated signals consisting of the tristimulus values for the ink color j, and $X_{1j}$ is the color separated signal corresponding to the ink color j as estimated from the reference values and the color separated signals.

15. A color picture reader of claim 13, further comprising a parameter switch by which the matrix elements can be input manually.

16. A color correction method for a device which reads a color picture by means of a plurality of color separated signals, comprising the steps of:
setting reference values,
projecting light on a reference plate from the light source,
obtaining a matrix which cancels spectral component variations in the light from the light source based on reference values and spectral components of the color separated signals, and
carrying out color correction by transforming the plurality of color separated signals for the color picture that was read, by means of the matrix thus obtained.

17. A color correction method of claim 16, wherein the step for obtaining the matrix includes selecting a suitable matrix from among a plurality of predetermined matrixes.

18. A color correction method of claim 16, wherein a reference plate having a color for which the variations in the emission sepctral distribution of the light source are large is used as said reference plate.

19. A device for reading a color picture by means of a plurality of color separated signals, comprising:

a light source for projecting light on the color picture,
light receiving means for receiving light which is reflected from the color picture, and for outputting a plurality of color separated signals based on the light received, and
means for controlling a spectral component of the light from the light source so as to minimize the difference between spectral components of the predetermined reference values and the color separated signals that correspond to the light from the light source, by comparing the two.

20. A device for reading a color picture by means of a plurality of color separated signals, comprising:
a light source for radiating light on an object to be read;
a heating element for heating said light source;
a controller for controlling said heating element;
light receiving means for receiving light which is reflected from the object to be read, and for outputting a plurality of color separated signals based on the light received; and
means for controlling the light source, by comparing color separated signals obtained based on the light reflected from a reference plate with predetermined reference values so as to make the difference between the two to be zero, the reference values being determined from the color separated signals that are output by the light receiving means, based on the light from the light source reflected from the reference plate under standard conditions, and the controlling means controlling the light source based on the comparison between normalized reference values and normalized color separated signals.

21. A color picture reader of claim 20 wherein the controlling means is a CPU.

22. A color picture reader of claim 21, further comprising: a temperature sensor for measuring the temperature of the light source.

23. A color picture reader of claim 22, wherein said controller controls the heating element so as to maintain the temperature of the light source at the temperature which is memorized as the temperature of the light source at a time of setting the reference values.

* * * * *